(12) United States Patent
Oi

(10) Patent No.: US 9,250,095 B2
(45) Date of Patent: Feb. 2, 2016

(54) ONBOARD DISPLAY DEVICE

(75) Inventor: Makoto Oi, Hyogo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1070 days.

(21) Appl. No.: 13/381,314

(22) PCT Filed: Oct. 22, 2009

(86) PCT No.: PCT/JP2009/005558
§ 371 (c)(1),
(2), (4) Date: Dec. 28, 2011

(87) PCT Pub. No.: WO2011/048633
PCT Pub. Date: Apr. 28, 2011

(65) Prior Publication Data
US 2012/0105472 A1    May 3, 2012

(51) Int. Cl.
*G06F 3/0482* (2013.01)
*G01C 21/36* (2006.01)

(52) U.S. Cl.
CPC .......... *G01C 21/3664* (2013.01); *G06F 3/0482* (2013.01)

(58) Field of Classification Search
CPC ..... G06F 3/0482; G06F 3/1225; G06F 3/123; G06F 3/1239; G06F 17/3069; G01C 21/3664; H04N 21/4312; H04N 21/4858; G06K 9/6828
See application file for complete search history.

(56) References Cited

U.S. PATENT DOCUMENTS

| | | | | |
|---|---|---|---|---|
| 5,396,588 A * | 3/1995 | Froessl | ............. | G06F 17/30253 382/217 |
| 5,413,420 A * | 5/1995 | Ishida | .................. | G06F 17/214 400/61 |
| 5,416,898 A * | 5/1995 | Opstad | .................. | G06F 17/214 345/468 |
| 5,444,829 A * | 8/1995 | Kawabata | ............. | G06F 3/1297 715/210 |
| 5,469,514 A * | 11/1995 | Kawamura | ........... | G06K 15/128 358/1.11 |
| 5,625,375 A * | 4/1997 | Keen | ........................ | G09G 3/04 345/467 |
| 5,671,339 A * | 9/1997 | Kumada | ................. | G06K 15/02 358/1.1 |
| 5,742,744 A * | 4/1998 | Migishima | ............. | G06K 15/02 358/1.11 |
| 5,761,395 A * | 6/1998 | Miyazaki | ............... | G06K 15/02 358/1.11 |
| 6,452,597 B1 * | 9/2002 | Goldberg | ................. | G09G 5/00 340/7.55 |
| 7,064,757 B1 * | 6/2006 | Opstad | .................. | G06F 17/214 345/467 |

(Continued)

FOREIGN PATENT DOCUMENTS

DE      10151007 A1    4/2003
DE      10318470 A1    7/2004

(Continued)

*Primary Examiner* — Shen Shiau
(74) *Attorney, Agent, or Firm* — Birch, Stewart, Kolasch & Birch, LLP

(57) ABSTRACT

An onboard display device includes multiple screen data that define plural types of screen designs including a character string display frame with equal size; plural types of font data; and multiple character string tables which record character strings to be displayed on a screen with one of the screen designs defined by the plural types of screen data, are each provided for one of the plural types of font data, and include character strings whose written forms are altered according to character size defined by the font data so that the character strings can be contained in the display frame, wherein the decision unit 12 decides a display type to be used for screen display on a display unit, and the display unit 6 displays the screen using the screen data, font data and character string corresponding to the display type decided by the decision unit 12.

5 Claims, 9 Drawing Sheets

(56) References Cited

U.S. PATENT DOCUMENTS

| | | | |
|---|---|---|---|
| 7,107,145 B2 * | 9/2006 | Ichida | G09B 29/007 701/532 |
| 8,019,903 B2 * | 9/2011 | Hanks | G06F 1/3265 710/2 |
| 2005/0270290 A1 * | 12/2005 | Liu | G06F 17/214 345/467 |
| 2006/0136120 A1 | 6/2006 | Koga | |
| 2007/0067415 A1 * | 3/2007 | Kawaguchi | G01C 21/3697 709/217 |
| 2007/0252680 A1 | 11/2007 | Pfeiffer et al. | |
| 2008/0082913 A1 | 4/2008 | Lloyd | |
| 2008/0266298 A1 | 10/2008 | Hess et al. | |
| 2008/0320396 A1 * | 12/2008 | Mizrachi | H04M 1/72561 715/744 |
| 2009/0115592 A1 * | 5/2009 | Miake et al. | 340/459 |
| 2009/0138934 A1 * | 5/2009 | Aoki | H04N 5/445 725/131 |
| 2009/0174715 A1 * | 7/2009 | Adachi et al. | 345/467 |
| 2010/0020104 A1 * | 1/2010 | Mitsumata | G09G 5/26 345/660 |
| 2010/0164698 A1 * | 7/2010 | Tsubooka et al. | 340/425.5 |
| 2010/0207748 A1 | 8/2010 | Distler et al. | |
| 2010/0238129 A1 * | 9/2010 | Nakanishi | G06F 3/016 345/173 |
| 2011/0145863 A1 * | 6/2011 | Alsina | G06F 9/4445 725/44 |
| 2011/0227942 A1 * | 9/2011 | Fujimoto | B60K 35/00 345/619 |
| 2011/0246891 A1 * | 10/2011 | Schubert | G06F 9/4445 715/719 |
| 2012/0143503 A1 * | 6/2012 | Hirai | G01C 21/3688 701/527 |

FOREIGN PATENT DOCUMENTS

| | | |
|---|---|---|
| DE | 102004009459 A1 | 9/2005 |
| DE | 102004035425 A1 | 3/2006 |
| DE | 102005038462 A1 | 2/2007 |
| DE | 102006034970 A1 | 1/2008 |
| DE | 102006052663 A1 | 5/2008 |
| DE | 102007035379 A1 | 1/2009 |
| DE | 102007046714 A1 | 4/2009 |
| DE | 102007051010 A1 | 4/2009 |
| EP | 1988363 A2 | 11/2008 |
| JP | 2005-181130 A | 7/2005 |
| JP | 2007-58456 A | 3/2007 |

* cited by examiner

FIG.1
(a)
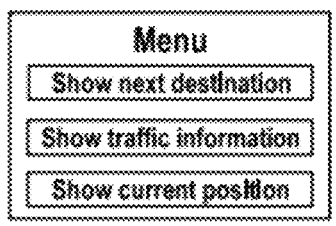
(b)
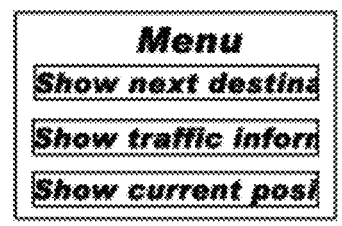

FIG.3
(a) 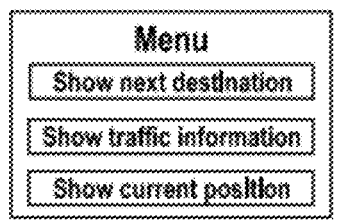
(b) 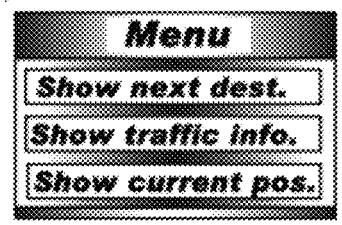

FIG.4

| Model | Display Type |
|---|---|
| Model A | Display Type 1 |
| Model B | Display Type 1 |
| Model C | Display Type 1 |
| Model D | Display Type 2 |
| Model E | Display Type 1 |
| Model F | Display Type 2 |

ONBOARD DISPLAY DEVICE

TECHNICAL FIELD

The present invention relates to an onboard display device for displaying information on a display screen of onboard equipment or in a display frame of a dashboard.

BACKGROUND ART

Onboard equipment such as a car navigation system and car audio system is usually designed in such a manner that a single type of onboard equipment is mountable in plural types of vehicles. In this case, it is desirable for both an onboard equipment maker and carmaker to be able to apply a single type of onboard equipment to as many types of vehicles as possible.

A reason for this is that from a standpoint of an onboard equipment maker, it is feared that an increased number of types of the onboard equipment can complicate manufacturing management and increase management costs. In addition, from a standpoint of a carmaker, it is feared that mounting dedicated onboard equipment in a specific model individually is apt to bring about an excess or shortage of stock of the onboard equipment in the process of manufacturing vehicles, which will impair production efficiency.

In order that a single type of onboard equipment (navigation system) can implement navigation suitable for models of vehicles or for an environment where the vehicles are used, Patent Document 1 discloses a navigation system that switches, in accordance with vehicle information, setup information to be set in a processing program for executing the navigation.

On the other hand, as for display contents of the onboard equipment, it is desirable to have unity of design with the interior design of a vehicle. In particular, popular cars or luxury cars have a greater demand for that.

In addition, as for font design of characters to be displayed on the display frame of the dashboard, since it varies depending on the type of a vehicle, it is convenient for a font of character strings to be displayed on the onboard equipment to be switched in conjunction with the switching of the screen design in order that a single type of onboard equipment can cope with plural types of vehicles.

The onboard equipment, however, has a small display in general. Accordingly, when changing the font of the character strings without altering a screen layout, there are some cases where the character strings are not contained in a display frame on the screen. Since such a condition deteriorates the visibility of a user, that font cannot be employed.

Thus, when using only a font contained in display frames, the font has a possibility of impairing the unity of design with the interior design. Accordingly, when emphasizing the unity of design with the interior design of the vehicle, a problem arises of restricting the types of vehicles capable of mounting the single type of onboard equipment.

Incidentally, Patent Document 1 does not disclose means for solving the problems about the screen design and character display described above.

The present invention is implemented to solve the foregoing problems. Therefore it is an object of the present invention to provide an onboard display device capable of providing screen design and character display matching a plurality of models of vehicles.

PRIOR ART DOCUMENT

Patent Document

Patent Document 1: Japanese Patent Laid-Open No. 2005-181130.

DISCLOSURE OF THE INVENTION

An onboard display device in accordance with the present invention includes: a screen data storage unit for storing a plurality of screen data that define plural types of screen designs including a character string display frame with equal size; a font data storage unit for storing plural types of font data; a character string table storage unit for storing a plurality of character string tables which record character strings to be displayed on each screen with one of the screen designs defined by the plural types of screen data, wherein the character string tables are each provided for one of the plural types of font data and include character strings whose written forms are altered in accordance with character size defined by the font data so that the character strings are contained in the display frame; a display unit for displaying a screen using the screen data, the font data and a character string in the character string tables; a decision unit for deciding a display type which indicates a combination of the screen data, the font data and the character string in the character string tables to be used for screen display on the display unit; a screen data acquiring unit for acquiring the screen data corresponding to the display type decided by the decision unit from the screen data storage unit; a font data acquiring unit for acquiring the font data corresponding to the display type decided by the decision unit from the font data storage unit; a character string data acquiring unit for acquiring the character string in the character string table corresponding to the display type decided by the decision unit from the character string table storage unit; and a display control unit for controlling the display unit so as to display the screen using the screen data acquired by the screen data acquiring unit, the font data acquired by the font data acquiring unit and the character string acquired by the character string data acquiring unit.

According to the present invention, it includes multiple screen data that define plural types of screen designs including a character string display frame with equal size; plural types of font data; and multiple character string tables which record character strings to be displayed on a screen with one of the screen designs defined by the plural types of screen data, are each provided for one of the plural types of font data, and include character strings whose written forms are altered according to character size defined by the font data so that the character strings can be contained in the display frame, wherein the decision unit decides a display type to be used for screen display on a display unit, and the display unit displays the screen using the screen data, font data and character string corresponding to the display type decided by the decision unit.

Thus, even for the font data that defines the character size that cannot be contained in the display frame, by recording the character string whose written form is altered so as to be contained in the display frame, it can eliminate the problem of being unable to visually confirm the character string because the character string overflows the display frame. This offers an advantage of enabling a single onboard display device to provide the screen designs and character displays matching a plurality of models of vehicles.

BRIEF DESCRIPTION OF THE DRAWINGS

FIG. 1 is a diagram showing an example of font switching on a display screen;

FIG. 3 is a diagram showing an example of a menu screen displayed by the onboard display device of the embodiment 1;

FIG. 4 is a diagram showing an example of a table exhibiting correspondence between models of cars and display types;

EMBODIMENTS FOR CARRYING OUT THE INVENTION

Figure 2:
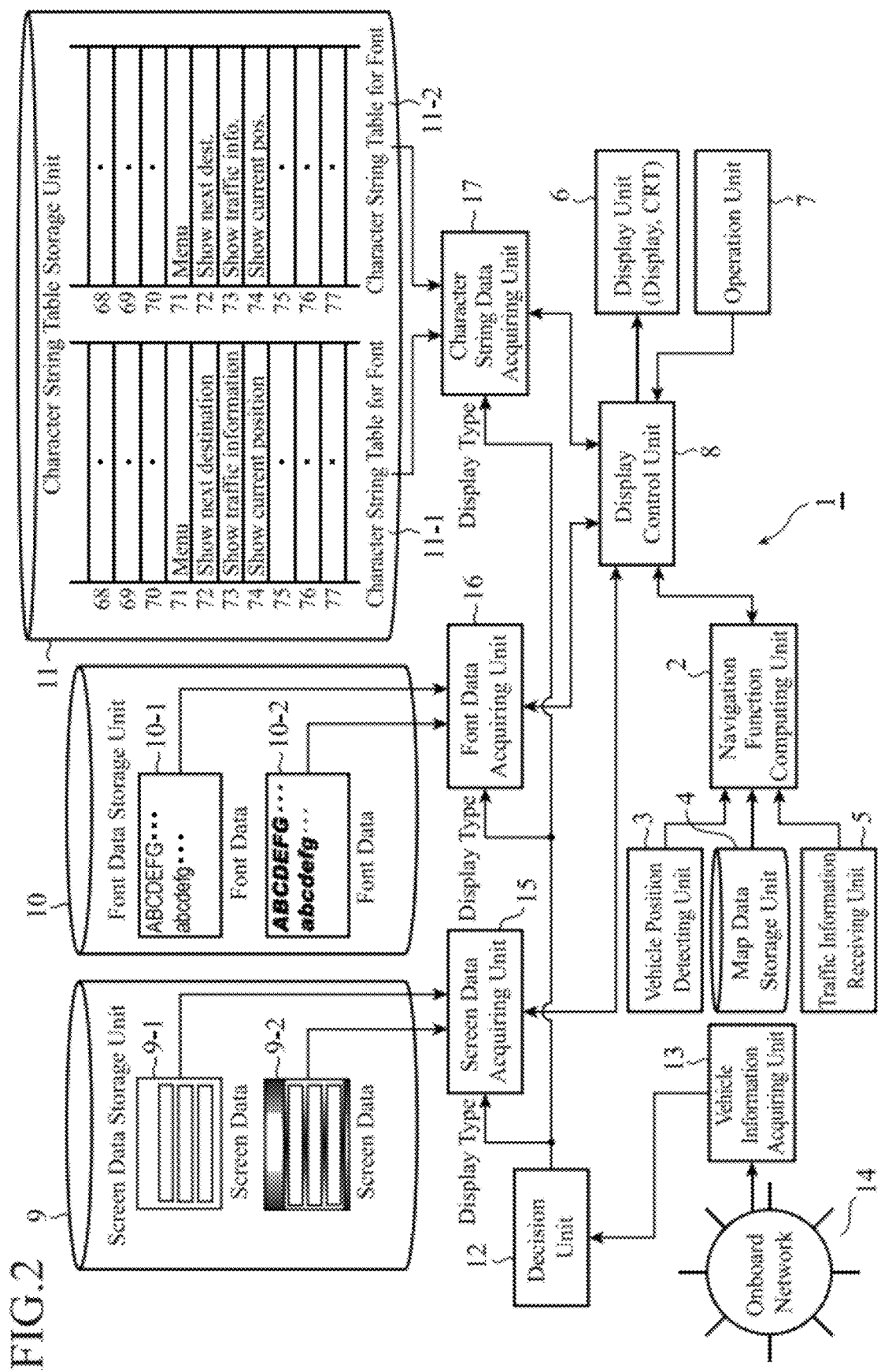
FIG. 2 is a block diagram showing a configuration of a car navigation system employing an onboard display device of an embodiment 1 in accordance with the present invention.

The best mode for carrying out the invention will now be described with reference to the accompanying drawings to explain the present invention in more detail.

Embodiment 1

First, the term "onboard equipment" in the present invention refers to an apparatus which is mounted in a vehicle such as a car navigation system or car audio system, and has a man-machine interface with a passenger of the vehicle (called a user from now on) via screen display.

An onboard display device in accordance with the present invention is applied as a display device of the onboard equipment, and displays information on a display screen or in display frames of the dashboard as a man-machine interface.

Here, we will describe the problem involved in switching only a font of character strings without changing a screen layout on the display screen of a car navigation system.

FIG. 1 is a diagram showing font switching on a display screen, which shows a case of switching a font in a menu screen of a car navigation system. When touching a software button (referred to as a SW button from now on) indicating "Show next destination" on the screen shown in FIG. 1, the screen makes the transition to a screen displaying information on a destination in the navigation.

In addition, touching a SW button "Show traffic information" will cause the screen to make the transition to the display of traffic information such as congestion conditions.

Furthermore, touching a SW button "Show current position" will cause the screen to make the transition to the display of information about the current position of the vehicle.

It is assumed about the screens shown in FIG. 1(a) and FIG. 1(b) that the screen layout is not changed, and the size of the SW buttons is the same. The screen shown in FIG. 1(b) uses a font of characters each of which has the width greater than that of a character font which represents the SW buttons in FIG. 1(a). Accordingly, character strings cannot be contained in the display frames of the SW buttons. Thus, the screen is comparatively small on the onboard equipment in general, and the size of the display frames for giving character strings with a lot of characters is fixed. Accordingly, when the font is changed, the character strings are apt to overflow the display frames.

Since the character strings that cannot be contained in the display frames as shown in FIG. 1(b) exert an influence upon the visibility of a user, even if the font has unity with the interior design of the vehicle, it cannot be employed.

For example, while the other apparatuses of the dashboard mounted in the vehicle display characters of the font shown in FIG. 1(b), if only the screen of the navigation system displays characters of the font shown in FIG. 1(a), the unity of design is lost.

In addition, as for two types of vehicles, when the characters of the font shown in FIG. 1(a) match the interior design of a first vehicle, but the characters of the font shown in FIG. 1(b) match the interior design of a second vehicle, switching only the font offers a problem of being unable to contain them in the display frames as described above. Incidentally, types of vehicles comprehend differences between business cars and popular cars or between luxury cars and popular cars as well.

The onboard display device in accordance with the present invention switches a screen design in accordance with the type of a vehicle, and switches, in conjunction with the switching of the screen design, the font to the font corresponding to the screen design at the same time, thereby being able to provide a screen design and character display corresponding to plural types of vehicles.

FIG. 2 is a block diagram showing a configuration of a car navigation system employing the onboard display device of the embodiment 1 in accordance with the present invention. The car navigation system 1 shown in FIG. 2 comprises as components for achieving its navigation functions a navigation function computing unit 2, a vehicle position detecting unit 3, a map data storage unit 4, a traffic information receiving unit 5, a display unit 6, an operation unit 7 and a display control unit 8; and comprises as components for achieving functions of the onboard display device of the embodiment 1 a screen data storage unit 9, a font data storage unit 10, a character string table storage unit 11, a decision unit 12, a vehicle information acquiring unit 13, a screen data acquiring unit 15, a font data acquiring unit 16 and a character string data acquiring unit 17.

The navigation function computing unit 2 is a component for executing arithmetic processing for implementing car navigation functions of the car navigation system 1. The vehicle position detecting unit 3 is a component for detecting the vehicle position. It receives GPS (Global Positioning System) signals, for example, and detects the latitude and longitude of the vehicle position. The map data storage unit 4 is a storage unit for storing map data used for car navigation processing in the navigation function computing unit 2. The traffic information receiving unit 5 is a component for receiving a broadcast such as VICS (Vehicle Information and Communication System) (registered trademark: mention thereof will be omitted from now on) or TMC (Traffic Message Channel), and for acquiring traffic information such as congestion conditions on a road.

The display unit 6, which is a display device mounted in the vehicle, is a component corresponding to the display device of the car navigation system 1, for example. If the onboard display device of the embodiment 1 is applied to the onboard equipment relating to dashboard gauges, the display unit 6 corresponds to a display device for displaying the dashboard gauges. The operation unit 7, which is a component for a user to perform input operation to the onboard equipment, employs a touch screen, joystick or the like. The display control unit 8, which is a component for controlling the screen display on the display unit 6, executes control calculations relating to the man-machine interface using the screen display on the display unit 6.

The screen data storage unit 9 is a storage unit for storing screen data 9-1 and 9-2 that define screen design. The term "screen design" in the present invention refers to components such as icons, SW buttons, and display windows (windows) to be displayed on the screen of the display unit 6, patterns to be drawn on the components or screen background and display contents determined from images to be drawn on them. Here, the screen data 9-1 and 9-2 are data giving patterns consisting of SW buttons, in which although the size and layouts of the SW buttons are the same, patterns drawn on the screen background differ from each other. Incidentally, as shown in FIG. 1, the SW buttons each constitute a display frame for giving a character string.

The font data storage unit 10 is a storage unit for storing font data 10-1 and 10-2 of character strings to be displayed on the screen of the display unit 6. When using a bitmap font, the font data storage unit 10 retains bitmap data for each character so that corresponding bitmap data can be referred to by using the character code as an index.

In addition, when using a scalable font, the font data storage unit 10 retains vector data designating a shape of each character so that corresponding vector data can be referred to by using the character code as an index.

An example using a bitmap font will be described in the following explanation for simplification.

In addition, in the present invention, font data are used by classifying into a utility-oriented font and a design-oriented font. For example, the font data 10-1 is assumed to be a utility-oriented font and the font data 10-2 is assumed to be a design-oriented font.

Here, the term "utility-oriented font" refers to a font which is applied to a character string that does not use abbreviations of words when written on the screen so that the meaning of the character string can be recognized as it is, and which does not have design characteristics in the written form. For example, there are Mincho typeface and Gothic type with a consistent width.

In contrast, the term "design-oriented font" refers to a font which emphasizes the design rather than simplicity for recognizing the meaning, and which is applied to abbreviations of words when a display frame on the screen cannot hold the width of characters (length of the string). For example, there are such fonts as a pop type, wide Gothic characters and running style.

FIG. 3 is a diagram showing an example of a menu screen displayed by the onboard display device of the embodiment 1: FIG. 3(*a*) shows an example using a utility-oriented font; and FIG. 3(*b*) shows an example using a design-oriented font.

As shown in FIG. 3(*a*), as for the utility-oriented font, character strings are given which represent the meaning without using an abbreviation. On the other hand, as for the design-oriented font, since the strings overflow the display frames when given in the same manner as the utility-oriented font as shown in FIG. 3(*b*), they are given using abbreviations.

The character string table storage unit 11 is a storage for storing character string tables in which a list of character strings to be displayed on the screen of the display unit 6 is recorded in the form of text data. Indexes in the table are the same as character string numbers. The present embodiment 1 has a character string table 11-1 written in the font data 10-1 and a character string table 11-2 written in the font data 10-2.

In the two character string tables 11-1 and 11-2, character strings with the same index are assumed to have the same meaning.

The font data 10-2 is a design-oriented font employing a wide font. Accordingly, as for the character strings recorded in the character string table 11-2, considering the size of the display frame on the screen of the display unit 6, the number of characters is reduced by using abbreviations so as to be contained in the display frame. In addition, a word itself can be replaced by an interchangeable word having the same meaning and a smaller number of characters. Furthermore, a character string itself can be replaced by an interchangeable character string having the same meaning and a smaller number of characters.

The decision unit 12 is a component for deciding the display type according to the vehicle information acquired by the vehicle information acquiring unit 13. Here, it decides whether the display type is display type 1 or display type 2. For the display type 1, the screen data 9-1, font data 10-1 and character string table 11-1 are applied, and for the display type 2, the screen data 9-2, font data 10-2 and character string table 11-2 are applied.

The display types 1 and 2 are each designated by a digital value corresponding to them (for example, the display type 1 is designated by a digital value "0" and display type 2 by a digital value "1"). When deciding the display type, the decision unit 12 outputs the digital value corresponding to the display type decided to the screen data acquiring unit 15, font data acquiring unit 16 and character string data acquiring unit 17. Thus the screen data acquiring unit 15, font data acquiring unit 16 and character string data acquiring unit 17 decide the display type from the digital value received from the decision unit 12.

The embodiment 1 uses, as the vehicle information, information about the model of a vehicle. Display types are set appropriately in advance in accordance with models of vehicles capable of mounting a car navigation system to which an onboard display device in accordance with the present invention is applied. In this case, the display type is decided considering the unity between the interior design of the vehicle and the screen display.

FIG. 4 is a diagram showing an example of a table exhibiting correspondence between models of cars and display types, which provides data to which the decision unit 12 refers when deciding the display type. As shown in FIG. 4, one of the display types 1 and 2 is set to the models of cars A-F. Referring to the table shown in FIG. 4, the decision unit 12 decides the display type corresponding to the model acquired by the vehicle information acquiring unit 13.

Incidentally, as for the table data shown in FIG. 4, they can be installed in the decision unit 12 in the form of defining data, or can be hard-coded as program code for implementing the functions of the decision unit 12.

The vehicle information acquiring unit 13 is a communication unit capable of data communication with the outside via an onboard network 14, and acquires information about the model of the vehicle used by the decision unit 12 to decide the display type. The screen data acquiring unit 15 is a component for acquiring from the screen data storage unit 9 the screen data corresponding to the display type decided by the decision unit 12. The font data acquiring unit 16 is a component for acquiring from the font data storage unit 10 the font data corresponding to the display type decided by the decision unit 12. The character string data acquiring unit 17 is a component for acquiring from the character string table storage unit 11 the character string data corresponding to the display type decided by the decision unit 12.

Next, the operation will be described.

First, when a user performs a manipulation for causing the display unit 6 to display the screen as shown in FIG. 3 via the operation unit 7, for example, the display control unit 8 instructs the screen data acquiring unit 15 to acquire from the screen data storage unit 9 the screen data that defines the screen design (background image) designated by the operation.

Figure 5:
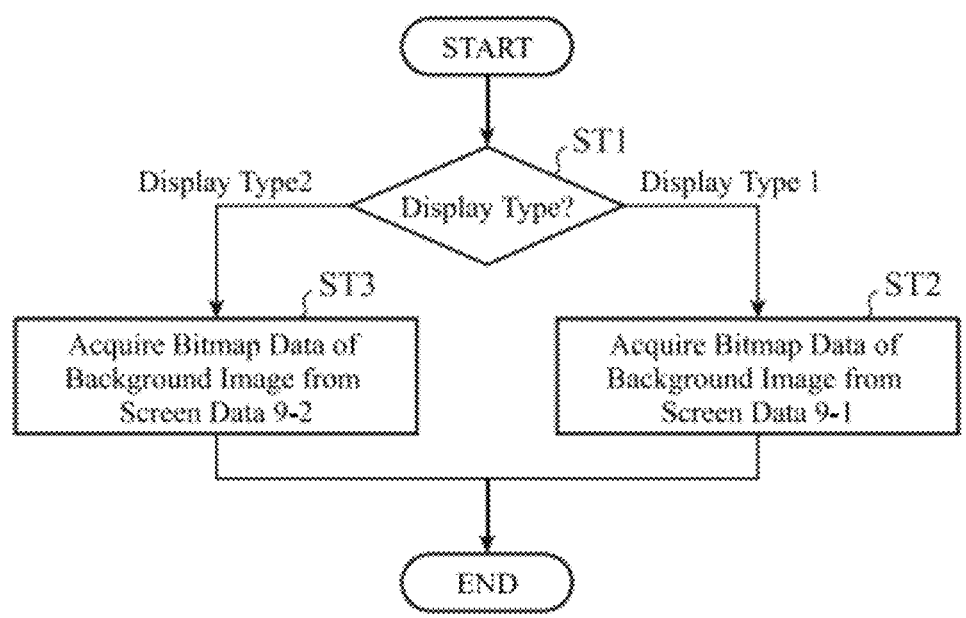
FIG. 5 is a flowchart showing a flow of the operation of the screen data acquiring unit.

FIG. 5 is a flowchart showing a flow of the operation of the screen data acquiring unit. Receiving from the display control unit 8 the instruction to acquire the screen data, the screen data acquiring unit 15 decides whether the display type is the display type 1 or 2 (step ST1). The processing is executed in accordance with the digital value indicating the display type delivered from the decision unit 12.

When the display type delivered from the decision unit 12 is the display type 1, the screen data acquiring unit 15 acquires from the screen data 9-1 of the screen data storage unit 9 the bitmap data on the background image designated by the display control unit 8 and supplies to the display control unit 8 (step ST2).

Likewise, when the display type delivered from the decision unit 12 is the display type 2, the screen data acquiring unit 15 acquires from the screen data 9-2 of the screen data storage unit 9 the bitmap data on the background image designated by the display control unit 8 and supplies to the display control unit 8 (step ST3).

The screen data defines character string numbers of the character strings to be displayed on each screen in advance, and the display control unit 8 determines the character strings from the character string numbers. As described above, the character string number corresponds to the index number in the character string table. When displaying the menu screen as shown in FIG. 3, four types of character strings with index numbers 71, 72, 73 and 74 in the character string table shown in FIG. 2 are determined as the character strings to be displayed. The display control unit 8 notifies the character string data acquiring unit 17 of the character string number 71 extracted from the screen data and instructs it to acquire the character string data.

Figure 6:
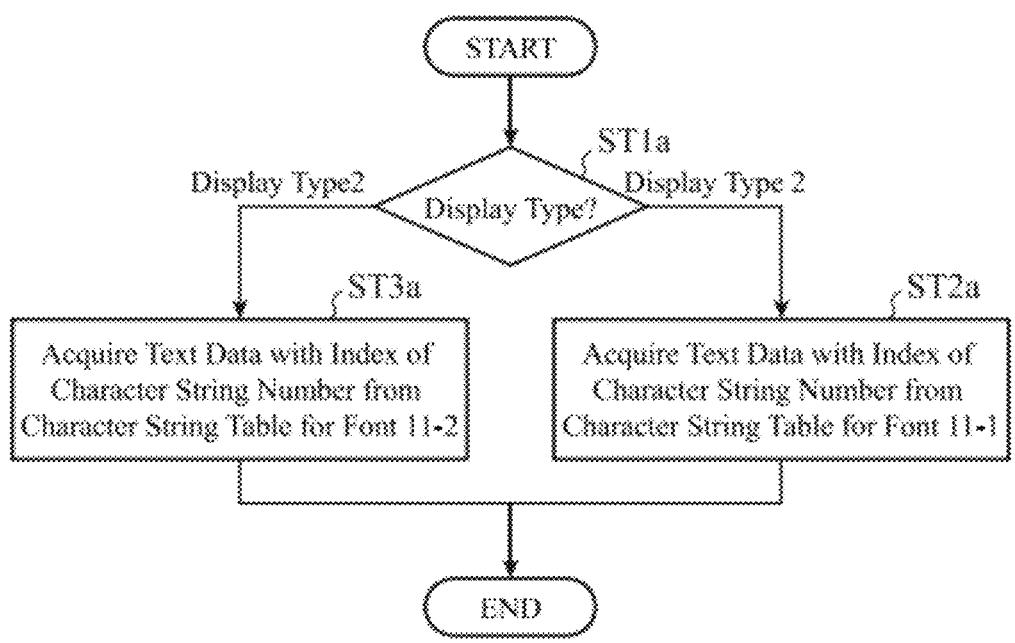
FIG. 6 is a flowchart showing a flow of the operation of the character string data acquiring unit.

FIG. 6 is a flowchart showing a flow of the operation of the character string data acquiring unit 17. Receiving from the display control unit 8 the instruction to acquire the character string data, the character string data acquiring unit 17 decides whether the display type is the display type 1 or 2 (step ST1a). The processing is executed according to the digital value indicating the display type delivered from decision unit 12 in the same manner as in the screen data acquiring unit 15.

When the display type delivered from the decision unit 12 is the display type 1, the character string data acquiring unit 17 acquires from the character string table 11-1 in the character string table storage unit 11 the text data on the character string with the same index number as the character string number designated by the display control unit 8, and supplies to the display control unit 8 (step ST2a).

Likewise, when the display type delivered from the decision unit 12 is the display type 2, the character string data acquiring unit 17 acquires from the character string table 11-2 in the character string table storage unit 11 the text data on the character string with the same index number as the character string number designated by the display control unit 8, and supplies to the display control unit 8 (step ST3a). In this case, as for a character string with the number of characters that cannot be contained in the display frame defined by the screen data 9-2, the text data is acquired whose number of characters is reduced using an abbreviation as shown in FIG. 2.

In the case of the character string number 71, the character string data acquiring unit 17 acquires from the character string table storage unit 11 the text data on the character string ("Menu") with the index number 71 equal to the character string number 71 delivered from the display control unit 8 in the character string table corresponding to the display type designated by the decision unit 12, and replies to the display control unit 8.

Next, the display control unit 8 supplies a character code of each character constituting the text data received from the character string data acquiring unit 17 to the font data acquiring unit 16 and instructs it to acquire the bitmap data corresponding to each character.

Figure 7:
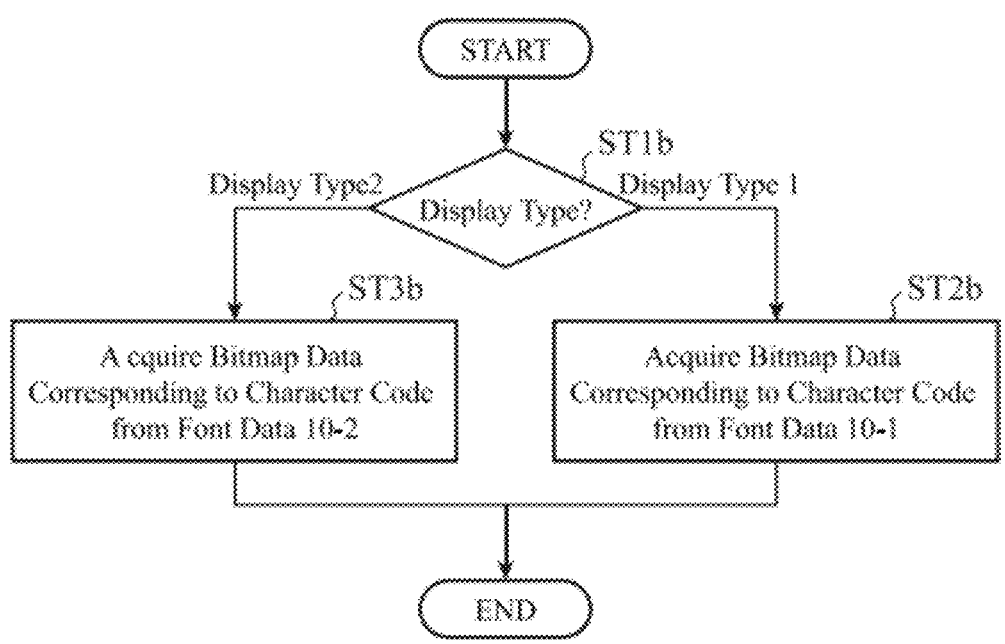
FIG. 7 is a flowchart showing a flow of the operation of the font data acquiring unit.

FIG. 7 is a flowchart showing a flow of the operation of the font data acquiring unit 16. When receiving the instruction to acquire the bitmap data of the characters from the display control unit 8, the font data acquiring unit 16 makes a decision as to whether the display type is the display type 1 or 2 (step ST1b). It executes the processing in accordance with the digital value indicating the display type delivered from the decision unit 12 in the same manner as the screen data acquiring unit 15.

If the display type delivered from the decision unit 12 is display type 1, the font data acquiring unit 16 acquires the bitmap data of the character codes designated by the display control unit 8 from the font data 10-1 in the font data storage unit 10, and supplies to the display control unit 8 (step ST2b).

Likewise, if the display type delivered from the decision unit 12 is display type 2, the font data acquiring unit 16 acquires the bitmap data of the character codes designated by the display control unit 8 from the font data 10-2 in the font data storage unit 10, and supplies to the display control unit 8 (step ST3b).

For example, the display control unit 8 supplies the font data acquiring unit 16 with the character codes of the individual characters "M", "e", "n" and "u" constituting the text data "Menu". The font data acquiring unit 16 acquires the bitmap data of the character codes fed from the display control unit 8 from the font data corresponding to the display type designated by the decision unit 12 and sends the bitmap data back to the display control unit 8. By executing the same processing on the character strings with the numbers 72, 73 and 74, it can acquire the bitmap data of the individual characters of all the character strings to be displayed on the menu screen shown in FIG. 3.

Finally, the display control unit 8 creates a bitmap image by superposing the bitmap data of the individual characters upon the prescribed places on the bitmap data of the screen data acquired previously, and supplies it to the display unit 6. Thus, the menu screen shown in FIG. 3(a) or FIG. 3(b) is displayed on the screen of the display unit 6.

Next, a setup method of the table exhibiting correspondence between models of cars and display types as shown in FIG. 4 will be described.

(A) Interior Design and Dashboard Equipment for Each Model.

The screen data, font data and character string table having the unity of design with at least one of the interior design of the vehicle and the screen the dashboard equipment displays are specified from the data stored in the screen data storage unit 9, font data storage unit 10 and character string table storage unit 11, and the correspondence is established between the model of the vehicle and the display type of the data specified.

Alternatively, the screen data, font data and character string table can be newly created based on the interior design of the vehicle and the screen design the dashboard equipment displays, and can be registered in the table by corresponding them to a new display type.

(B) Business Car and Popular Car.

According to models, vehicles can be classified into business cars and popular cars, and different display types can be assigned to the business cars and popular cars.

For example, a utility-oriented display is set to the business cars and a design-oriented display is set to the popular cars.

(C) Popular Cars and Luxury Cars.

According to models, vehicles can be classified into popular cars and luxury cars, and different display types can be assigned to the popular cars and luxury cars.

For example, a utility-oriented display is set to the popular cars, and a design-oriented display is set to the luxury cars.

Incidentally, as for the term "model" in the present embodiment 1, it can be a detailed classification that can be identified according to model numbers of vehicles or can be a broader classification such as "types" as long as the vehicle information acquiring unit 13 can acquire as the vehicle information. The term "type" refers to a classification such as "sports cars" and "sedans". In addition, when mounting single onboard equipment in vehicles of a plurality of carmakers, the model can be identification information about the carmakers. For example, when it is mounted in a vehicle made by Company A, the display type 1 is used, and when it is mounted in a vehicle made by Company B, the display type 2 is used.

As described above, according to the present embodiment 1, it comprises the plurality of screen data that define the plural types of screen designs having the character string display frames with the same size; the plural types of font data; and the plurality of character string tables which include character strings registered to be displayed on one of the screens with the screen designs defined by the plural types of screen data, which are provided for each of the plural types of font data, and which have character strings that have their written forms altered in such a manner that they can be contained in the display frames in accordance with the character size defined by the font data, wherein the decision unit 12 decides the display type used for the screen display of the display unit, and the display unit 6 displays the screen using the screen data, font data and character strings corresponding to the display type decided by the decision unit 12.

In this configuration, it further comprises the vehicle information acquiring unit 13 for acquiring the model information about the vehicle via communication with the outside, in which the decision unit 12 includes the table provided with a plurality of models and the display types corresponding to the individual models, and decides that the display type corresponding to the model of the vehicle is the display type to be used for the screen display of the display unit 6 by referring to the table according to the model information acquired by the vehicle information acquiring unit 13.

In this way, even when the font data corresponding to the model of the vehicle defines the character size that cannot be contained in the display frames, registering the character strings in advance whose written forms are altered so as to be contained in the display frames makes it possible to eliminate the problem that the character strings overflow the display frames and cannot be visually confirmed. This enables a single onboard display device 1 to offer the screen design and character display corresponding to a plurality of models of vehicles.

In addition, the present embodiment 1 can implement appropriate character string display in accordance with the features of each character font because it switches the character strings at the same time when switching to the character font having the unity of design with the interior design of the vehicle and the screen design of the dashboard equipment. For example, as for a font of narrow character width, character strings with a number of characters are allowed so that they give character string display with a sufficient amount of information and enable a user to grasp the meaning easily. In contrast, as for a font of broad character width, appropriate character string display can be achieved by adjusting the number of characters so as to be contained in the display frames on the screen.

Incidentally, there are some cases where a font that gives broader character width varies depending on characters or words. For example, it is conceivable that there is a case where the font data 10-1 is wider concerning the character A, but the font data 10-2 is wider concerning the, character B. In such a case, regardless of the concept of the utility-oriented or design-oriented, character strings using abbreviations can be registered in the character string table.

Embodiment 2

Figure 8:
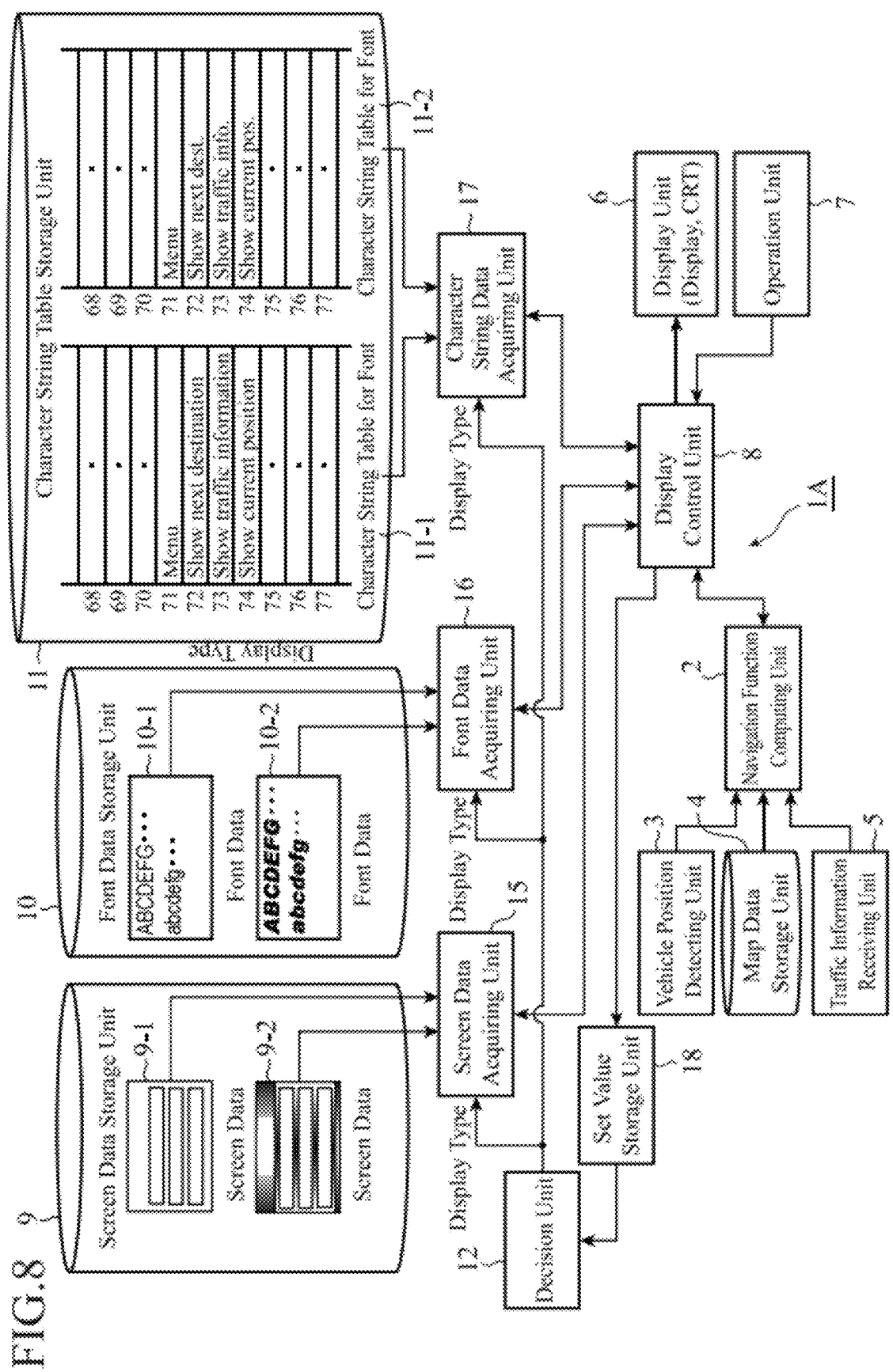
FIG. 8 is a block diagram showing a configuration of a car navigation system employing an onboard display device of an embodiment 2 in accordance with the present invention.

FIG. 8 is a block diagram showing a configuration of a car navigation system to which an onboard display device of an embodiment 2 in accordance with the present invention is applied. As for the configuration for implementing the navigation functions and the configuration for carrying out the functions of the onboard display device of the embodiment 2, although the car navigation system 1A shown in FIG. 8 has basically the same configuration as that of FIG. 2 described in the embodiment 1, it differs in providing a set value storage unit 18 instead of the vehicle information acquiring unit 13 in the configuration shown in FIG. 2. The set value storage unit 18 is a storage unit for storing set values of the display type shown in the embodiment 1.

Switching between combinations of screen design and a font can be made according to the setting of a user, which offers an advantage of being able to implement the screen display suiting user's liking. In the embodiment 2, the display control unit 8 causes the display unit 6 to display a screen for enabling a user to select a display type. When the user selects a display type on the selection screen using the operation unit 7, a digital value indicating the display type selected is stored in the set value storage unit 18 as a set value. According to the set value stored in the set value storage unit 18, the decision unit 12 decides the display type selected by the user. The processing using the display type decided in this way is the same as that of the foregoing embodiment 1.

As described above, according to the present embodiment 2, it comprises the operation unit 7 for inputting a manipulation from outside and the set value storage unit 18 for storing the set value indicating the display type selected using the operation unit 7, in which the decision unit 12 decides that the display type, which the set value stored in the set value storage unit 18 indicates, as the display type to be used for the screen display of the display unit 6. The configuration can offer the same advantages as those of the foregoing embodiment 1. In addition, it can implement the screen display suiting the user's liking.

Embodiment 3

Figure 9:
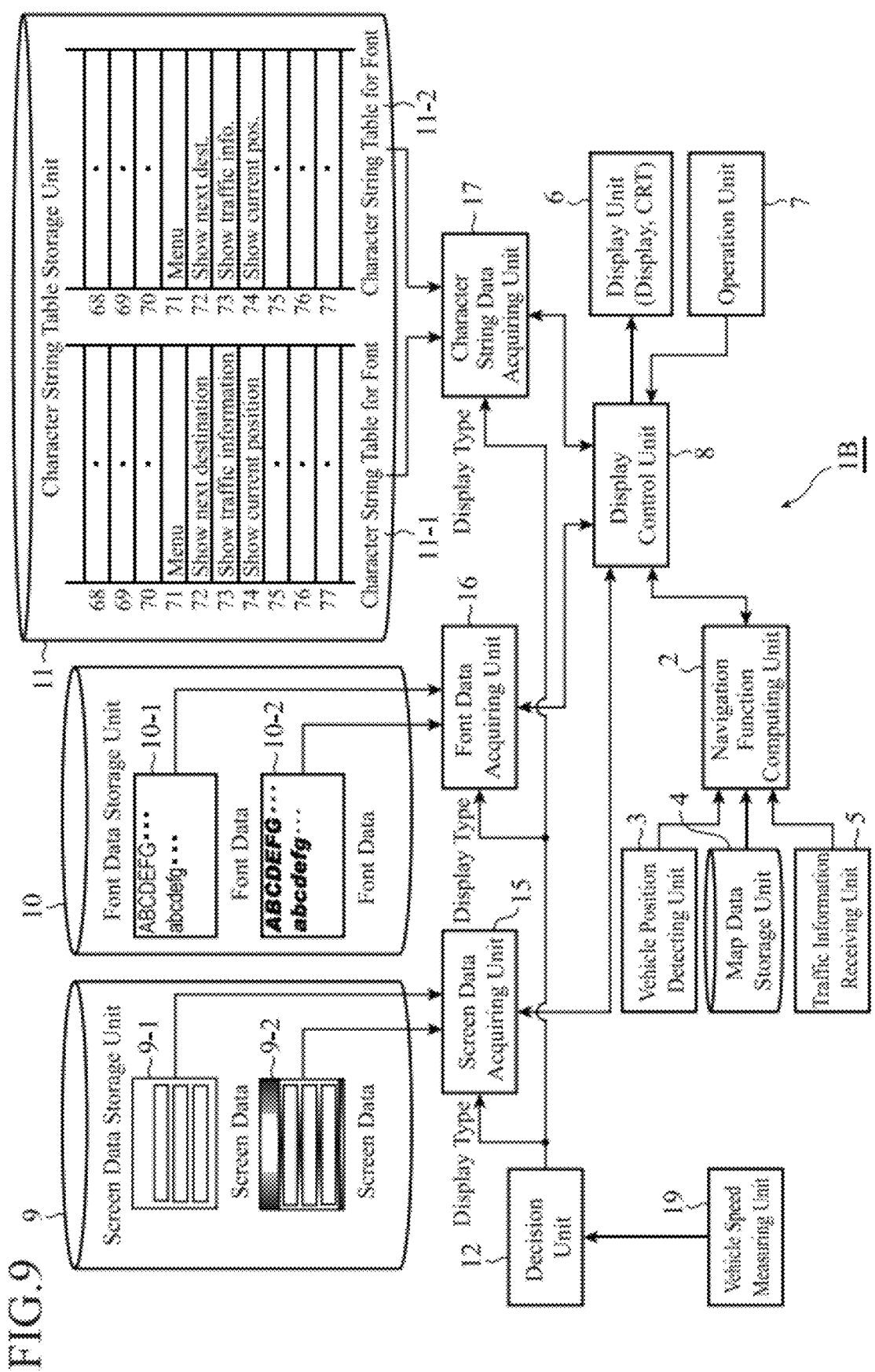
FIG. 9 is a block diagram showing a configuration of a car navigation system employing an onboard display device of an embodiment 3 in accordance with the present invention.

FIG. 9 is a block diagram showing a configuration of a car navigation system to which an onboard display device of an embodiment 3 in accordance with the present invention is applied. As for the configuration for implementing the navigation functions and the configuration for carrying out the functions of the onboard display device of the embodiment 3, although the car navigation system 1B shown in FIG. 9 has basically the same configuration as that of FIG. 2 described in the embodiment 1, it differs in providing a vehicle speed measuring unit 19 instead of the vehicle information acquiring unit 13 in the configuration shown in FIG. 2. The vehicle speed measuring unit 19 is a component for measuring the speed of a vehicle having the car navigation system 1B mounted therein.

In the decision unit 12 of the embodiment 3, a display type is set up in accordance with the state of the vehicle: whether it is moving or not. According to the vehicle speed information measured by the vehicle speed measuring unit 19, the decision unit 12 decides a different display type depending on whether the vehicle is moving or not, and changes the screen design of the display unit 6.

For example, when the vehicle speed is not zero and the vehicle is moving, it selects the display type 1 to carry out the utility-oriented display. In contrast, when the vehicle speed is zero and the vehicle is not moving, it selects the display type 2 to carry out the design-oriented display. By thus doing, it can implement the screen display in accordance with a vehicle state.

Here, the term "utility-oriented display" refers to a display using the font data that defines the character size enabling the character strings to be contained in the display frames as described in the foregoing embodiment 1. Since it does not use abbreviations, it has good visibility of the character strings.

In contrast with this, the "design-oriented display" gives a written form of characters with better design than the utility-oriented display. In addition, since the design-oriented display allows character size with which the character strings will overflow the display frames, the written form of the character strings can be altered so that they can be contained in the display frames depending on the font data.

As described above, according to the present embodiment 3, it comprises the vehicle speed measuring unit 19 for measuring the speed of the vehicle, wherein the decision unit 12 decides whether the vehicle is moving or not in accordance with the vehicle speed information measured by the vehicle speed measuring unit 13, and decides a different display type as the display type to be used for the screen display of the display unit 6 depending on whether the vehicle is moving or not.

In the configuration, the decision unit, in particular, decides, when the vehicle is moving, that the display type of the combination, which includes the font data that defines the character size that enables the character strings to be contained in the display frame, as the display type to be used for the screen display of the display unit 6, and decides, when the vehicle is not moving, that the display type of the combination, which includes the font data that defines the character size that enables the character strings to be altered in their written form so as to be contained in the display frame, as the display type to be used for the screen display of the display unit 6.

By thus doing, it can achieve the same advantages as those of the embodiment 1. In addition, it can implement the screen display in accordance with the vehicle state.

INDUSTRIAL APPLICABILITY

An onboard display device in accordance with the present invention can offer the screen design and character display that match a plurality of models of vehicles. Accordingly, it is suitable as a display device of a car navigation system or car audio system.

What is claimed is:
1. An onboard display device comprising:
a screen data storage unit for storing a plurality of screen data that define plural types of screen designs including a character string display frame with equal size;
a font data storage unit for storing plural types of font data;
a character string table storage unit for storing a plurality of character string tables each of which is associated with different types of the font data, each of the character string tables having a character string which is common between the character string tables, the common character strings indicating a same meaning and differing from each other in number of characters;
a display unit for displaying a screen using the screen data, the font data and a character string in the character string tables;
a controller programed to execute a process based on a decision by the onboard display device of a display type which indicates a combination of the screen data, the font data and the character string in the character string tables to be used for screen display on the display unit, the process comprising:
acquiring the screen data corresponding to the decided display type from the screen data storage unit;
acquiring the font data corresponding to the decided display type from the font data storage unit;
acquiring the character string in the character string table corresponding to the decided display type from the character string table storage unit; and
controlling the display unit so as to display the acquired screen using the screen data, the acquired font data, and the acquired character string.

2. The onboard display device according to claim 1, further comprising:
a data communication device connected to an onboard network to acquire model information about the vehicle via the network,
wherein the onboard display device:
has correspondence information in which a plurality of models of vehicles and display types matching the models are set; and
decides the display type matching the model of the vehicle as the display type to be used for the screen display of the display unit by referring to the correspondence information in accordance with the acquired model information.

3. The onboard display device according to claim 1, further comprising:
an operation unit manipulated by a user to select a display type; and
a set value storage unit for storing a set value designating the display type selected via the operation unit, wherein the display type designated by the set value stored in the set value storage unit is decided as the display type to be used for the screen display of the display unit.

4. The onboard display device according to claim 1, further comprising:
a vehicle speed measuring unit for measuring a speed of the vehicle, wherein
different display types are decided as the display type to be used for the screen display of the display unit depending on whether the vehicle is moving or not.

5. The onboard display device according to claim 4, wherein
when the vehicle is moving, a display type of the combination, which includes the font data that defines the character size that enables the character string to be contained in the display frame, is decided as the display type to be used for the screen display of the display unit; and when the vehicle is not moving, a display type of the combination, which includes the font data that defines the character size that enables a written form of the character string to be altered so as to be contained in the display frame, is decided as the display type to be used for the screen display of the display unit.

* * * * *